(12) United States Patent
Ishizaki

(10) Patent No.: US 7,970,802 B2
(45) Date of Patent: Jun. 28, 2011

(54) DOCUMENT DATA PROCESSING METHOD APPARATUS, AND SYSTEM FOR SENDING ENCODED DOCUMENT DATA

(75) Inventor: Tooru Ishizaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 11/947,062

(22) Filed: Nov. 29, 2007

(65) Prior Publication Data

US 2008/0133557 A1    Jun. 5, 2008

(30) Foreign Application Priority Data

Dec. 1, 2006   (JP) .................................. 2006-326139

(51) Int. Cl.
G06F 7/00 (2006.01)
G06F 17/30 (2006.01)

(52) U.S. Cl. ........................................ 707/809; 707/796

(58) Field of Classification Search .................. 707/999.001–999.005, 999.01, 707/999.1, 809, 796
See application file for complete search history.

(56) References Cited

U.S. PATENT DOCUMENTS

| | | | |
|---|---|---|---|
| 6,345,278 B1 * | 2/2002 | Hitchcock et al. ..................... 1/1 |
| 2002/0059367 A1 * | 5/2002 | Romero et al. ............... 709/203 |
| 2002/0144152 A1 * | 10/2002 | Ikeda ............................. 713/201 |
| 2004/0172599 A1 * | 9/2004 | Calahan ......................... 715/513 |
| 2005/0014494 A1 * | 1/2005 | Owen et al. ................... 455/419 |
| 2005/0049996 A1 * | 3/2005 | Srinivasan et al. ................ 707/1 |
| 2007/0113172 A1 * | 5/2007 | Behrens et al. ............... 715/513 |
| 2007/0113222 A1 * | 5/2007 | Dignum et al. ............... 717/143 |

FOREIGN PATENT DOCUMENTS

JP    2005-215951 A    8/2005

* cited by examiner

Primary Examiner — Mohammad Ali
Assistant Examiner — Kannan Shanmugasundaram
(74) Attorney, Agent, or Firm — Canon USA, Inc. IP Division

(57) ABSTRACT

XML document data is divided in a page tag unit, and an encoding table is created for each of the XML divided document data. Then, by using the encoding table, the XML divided document data is encoded to create code division data, and then the encoding table and code division data corresponding to the encoding table are sent to a printer. In this manner, the encoding tables with small redundancy and small data size are created, and the encoded XML document data and the code division data in small pieces are sent to the printer. Thus, even an apparatus with a small usable storage area such as an inexpensive printer can decode the XML document data by using the encoding tables with the small data size.

13 Claims, 14 Drawing Sheets

```
<svg width="1000" height="1000" viewBox="0 0 1000 1000"
    xmlns="http://www.w3.org/2000/svg" version="1.2" streamable="true">
  <pageSet>

<circle cx="300" cy="150" fill="red" stroke="black" />

<text x="50" y="850">
        Second Page
      </text>

</pageSet>
</svg>
```

FIG. 6

| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
|---|---|---|---|---|---|---|
| 0x00 | http://www.w3.org/2000/svg | | | | | Second Page |
| 0x01 | | svg | _0 0 | _0 1 | 1000 | |
| 0x02 | | width | | _0 2 | 0 0 1000 1000 | |
| 0x03 | | height | | _0 3 | 1.2 | |
| 0x04 | | viewBox | | _0 4 | true | |
| 0x05 | | version | | _0 5 | 300 | |
| 0x06 | | streamable | _0 6 | | | |
| 0x07 | | pageSet | _0 7 | | | |
| 0x08 | | page | _0 8 | | | |
| 0x09 | | circle | | _0 9 | 150 | |
| 0x0a | | cx | | _0 10 | red | |
| 0x0b | | cy | | _0 11 | black | |
| 0x0c | | fill | | _0 12 | 50 | |
| 0x0d | | stroke | | _0 13 | 850 | |
| 0x0e | | text | _0 14 | | | |
| 0x0f | | x | | _0 15 | | |
| | | y | | _0 16 | | |

| TYPE OF STRUCTURE | CODE |
|---|---|
| START TAG | 0000xxxx |
| characters | 0100xxxx |
| ATTRIBUTE | 1000xxxx |
| END TAG | 11111111 |
| ELEMENT WITH prefix and NAMESPACE NAME | 000011xx |
| ELEMENT WITHOUT prefix | 000001xx |
| ELEMENT WITHOUT NAMESPACE NAME | 000010xx |
| ELEMENT WITHOUT prefix and NAMESPACE NAME | 000000xx |
| ELEMENT WITH ATTRIBUTE VALUE | 0000xx01 |
| ELEMENT WITH NAMESPACE DECLARATION | 0000xx10 |
| ATTRIBUTE WITH prefix and NAMESPACE NAME | 10001100 |
| ATTRIBUTE WITHOUT prefix | 10000100 |
| ATTRIBUTE WITHOUT NAMESPACE NAME | 10001000 |
| ATTRIBUTE prefix and NAMESPACE NAME | 10000000 |

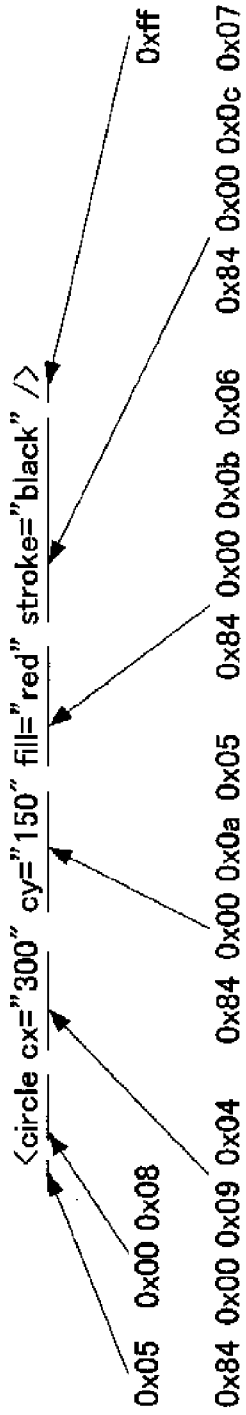

ENCODING TABLE OF PART 1

| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
|---|---|---|---|---|---|---|
| 0x00 | http://www.w3.org/2000/svg | svg | _0_0 | _0_1 | 1000 | |
| 0x01 | | width | _0_6 | _0_2 | 0 0 1000 1000 | |
| 0x02 | | height | | _0_3 | 1.2 | |
| 0x03 | | viewBox | | _0_4 | true | |
| 0x04 | | version | | _0_5 | | |
| 0x05 | | streamable | | | | |
| 0x06 | | pageSet | | | | |

ENCODING TABLE OF PART 2

| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
|---|---|---|---|---|---|---|
| 0x00 | http://www.w3.org/2000/svg | page | _0_0 | _0_2 | 300 | |
| 0x01 | | circle | _0_1 | _0_3 | 150 | |
| 0x02 | | cx | | _0_4 | red | |
| 0x03 | | cy | | _0_5 | black | |
| 0x04 | | fill | | | | |
| 0x05 | | stroke | | | | |

| | ENCODING TABLE OF PART 3 | | | | |
|---|---|---|---|---|---|
| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
| 0x00 | http://www.w3.org/2000/svg | page | _0_0 | | | Second Page |
| 0x01 | | text | _0_1 | | | |
| 0x02 | | x | | _0_2 | 50 | |
| 0x03 | | y | | _0_3 | 850 | |

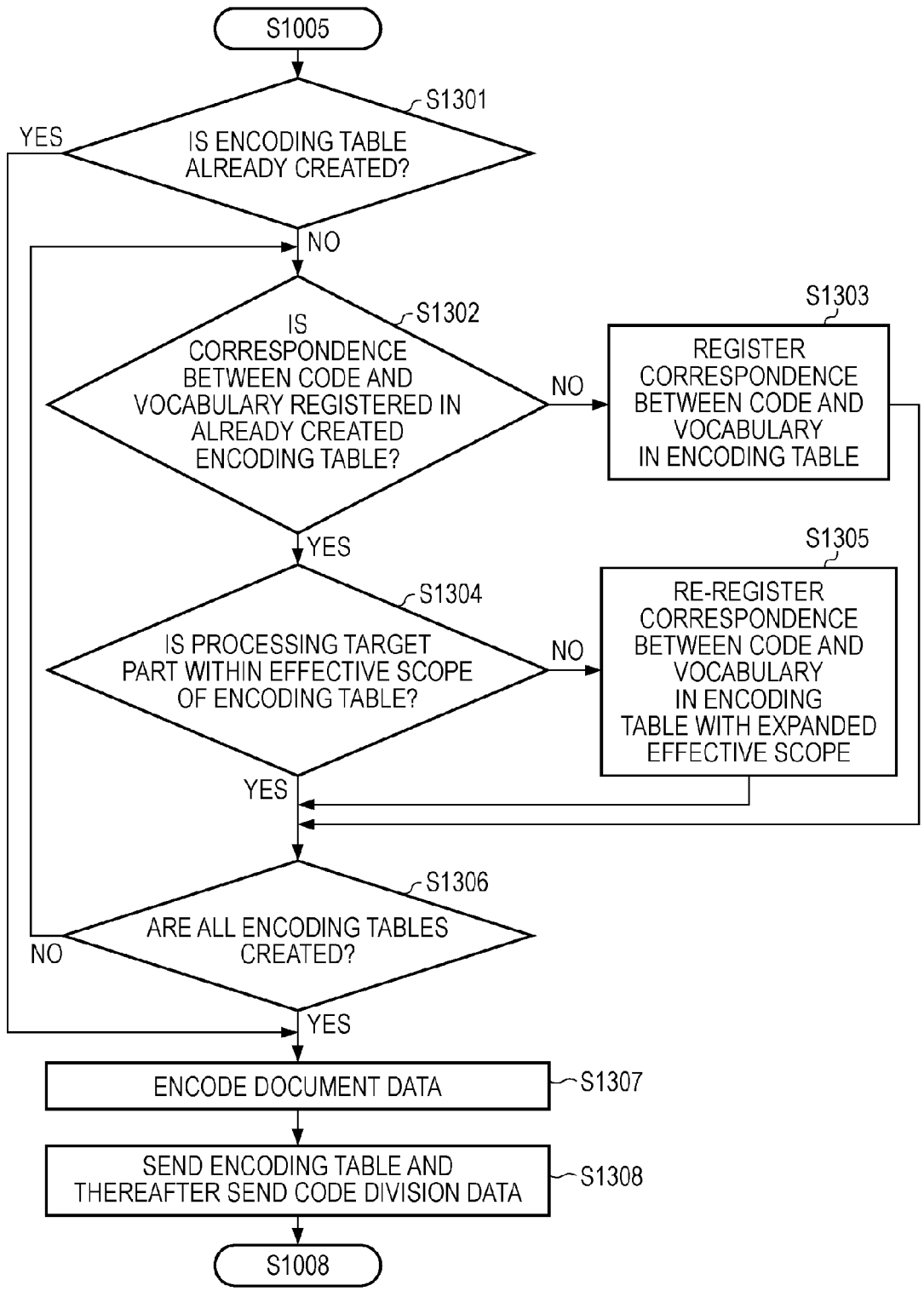

FIG. 13A

ENCODING TABLE WITH EFFECTIVE SCOPE FROM PART 1 TO PART 3

| SCOPE=3 | | | | | |
|---|---|---|---|---|---|
| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
| 0x00 | http://www.w3.org/2000/svg | | | | | |

FIG. 13B

ENCODING TABLE OF PART 1

| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
|---|---|---|---|---|---|---|
| 0x00 | | svg | _00 | | | |
| 0x01 | | width | _06 | _01 | 1000 | |
| 0x02 | | height | | _02 | 0 0 1000 1000 | |
| 0x03 | | viewBox | | _03 | 1.2 | |
| 0x04 | | version | | _04 | true | |
| 0x05 | | streamable | | _05 | | |
| 0x06 | | pageSet | | | | |

FIG. 13C

ENCODING TABLE WITH EFFECTIVE SCOPE FROM PART 2 AND PART 3

| SCOPE=2 | | | | | | |
|---|---|---|---|---|---|---|
| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
| 0x00 | | page | _00 | | | |

FIG. 13D

ENCODING TABLE OF PART 2

| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
|---|---|---|---|---|---|---|
| 0x00 |  | circle | _01 |  |  |  |
| 0x01 |  | cx |  | _02 | 300 |  |
| 0x02 |  | cy |  | _03 | 150 |  |
| 0x03 |  | fill |  | _04 | red |  |
| 0x04 |  | stroke |  | _05 | black |  |
| 0x05 |  |  |  |  |  |  |

FIG. 13E

ENCODING TABLE OF PART 3

| CODE | NAMESPACE NAME ENTRY | LOCAL NAME ENTRY | ELEMENT NAME ENTRY | ATTRIBUTE NAME ENTRY | ATTRIBUTE VALUE ENTRY | CHARACTERS ENTRY |
|---|---|---|---|---|---|---|
| 0x00 |  | text | _01 |  |  | Second Page |
| 0x01 |  | x |  | _02 | 50 |  |
| 0x02 |  | y |  | _03 | 850 |  |
| 0x03 |  |  |  |  |  |  |

DOCUMENT DATA PROCESSING METHOD APPARATUS, AND SYSTEM FOR SENDING ENCODED DOCUMENT DATA

BACKGROUND OF THE INVENTION

1. Field of the Invention

The present invention relates to a document data processing method, document data creating apparatus, and a document data processing system. In particular, the invention relates to a document data processing method, document data creating apparatus, and a document data processing system which are suitably used for decoding encoded document data.

2. Description of the Related Art

Data which is described in XML (extensible Markup Language) is text format data. Up to now, reading, writing, and saving of such data are performed based on the text format. The text format data is easy to handle for human beings. However, the data becomes redundant, and there is a problem that it takes time for a computer to perform reading and writing of the data. For this reason, a technology called binary XML has been used.

In the binary XML, each vocabulary such as an element name or an attribute name in the XML is replaced by a short code, thus providing data with small redundancy. For example, in Fast Infoset of Sun Microsystems, a number is allocated for each vocabulary such as the element name or the attribute name in the order of appearance in the XML data and each vocabulary is encoded. For example, according to Japanese Patent Laid-Open No. 2005-215951, an attribute name or an element is encoded through sorting in terms of data type such as an integer number and a character string.

In the binary XML, in order to decode the encoded data, it is necessary to use an encoding table that is a table representing a correspondence between a code and each vocabulary.

However, according to the above-described conventional technology, a single encoding table is allocated to the entire XML data. For this reason, as the number of types of vocabularies used in the XML data is larger, the size of the encoding table becomes larger. Therefore, an apparatus having a small usable memory area such as an inexpensive printer cannot hold the encoding table, and the encoded binary XML (each vocabulary) cannot be decoded in some cases.

As described above, according to the conventional technology, there is a problem that the document data described in a structured language for describing a document such as the XML (structured description language) may not be decoded by the apparatus having a small usable memory area.

SUMMARY OF THE INVENTION

An embodiment of the present invention has been made in view of the above-described problems and the present invention allows even an apparatus having a small usable memory area to decode document data.

The present invention provides a document data processing method, a document data creating apparatus, a program for instructing a computer to execute the document data processing method, and a document data processing system with which a plurality of encoding tables are created in a unit of divided document data and the divided data is encoded based on the encoding tables so that even an apparatus having a small usable memory area can decode the document data without having the encoding table for the entire document data.

According to an aspect of the present invention, a document data processing method is provided which includes dividing document data into plural pieces of document data; creating an encoding table representing a corresponding relation between a description of the divided document data and a code representing the description, in a unit of the divided document data; encoding the plural pieces of document data based on the created encoding tables; and sending to an external apparatus, the encoded document data and the encoding table corresponding to the document data in the unit of the divided document data.

According to another aspect of the present invention, there is provided a document data creating apparatus which includes a dividing unit configured to divide document data into plural pieces of document data; a creating unit configured to create an encoding table representing a corresponding relation between a description of the document data divided by the dividing unit and a code representing the description, in a unit of the document data divided by the dividing unit; an encoding unit configured to encode the plural pieces of document data obtained by the dividing unit based on the encoding tables created by the creating unit; and a sending unit configured to send to an external apparatus, the document data encoded by the encoding unit and the encoding table corresponding to the document data in the unit of the document data divided by the dividing unit.

According to another aspect of the present invention, a document data processing apparatus is provided which includes a reception unit configured to receive from an external apparatus, document data divided and encoded into plural pieces of document data and an encoding table corresponding to the document data in a unit of divided document data; and a decoding unit configured to decode the encoded document data by using the encoding table received from the reception unit, in which the encoding table is a table representing a corresponding relation between a description of the divided document data and a code representing the description.

According to yet another aspect of the present invention, a document data processing system is provided which includes the above-described document data processing apparatus and a document data creating apparatus. The document data creating apparatus includes a dividing unit configured to divide document data into plural pieces of document data; a creating unit configured to create an encoding table representing a corresponding relation between a description of the document data divided by the dividing unit and a code representing the description, in a unit of the document data divided by the dividing unit; an encoding unit configured to encode the plural pieces of document data obtained by the dividing unit based on the encoding tables created by the creating unit; and a sending unit configured to send to the document data processing apparatus, the document data encoded by the encoding unit and the encoding table corresponding to the document data in the unit of the document data divided by the dividing unit.

According to still another aspect of the present invention, a computer readable medium is provided containing computer-executable instructions for instructing a computer to execute a program for processing data. The medium includes computer-executable instructions for dividing document data into plural pieces of document data; computer-executable instructions for creating an encoding table representing a corresponding relation between a description of the divided document data divided and a code representing the description, in a unit of the divided document data; computer-executable instructions for encoding the plural pieces of divided document data obtained based on the created encoding tables; and computer-executable instructions for sending to an external apparatus, the encoded document data encoded and the encoding table corresponding to the document data in the unit of the divided document data divided.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 illustrates an example of the XML document data according to the first exemplary embodiment of the present invention.

FIG. 6 illustrates an encoding table example corresponding to the entire XML document data according to the first exemplary embodiment of the present invention.

FIG. 7 illustrates an example code representing a structure of the XML document data according to the first exemplary embodiment of the present invention.

FIG. 8 illustrates a result example after encoding a part of the XML document data by using the encoding table and the code representing the structure of the XML document data according to the first exemplary embodiment of the present invention.

FIG. 9 is a schematic diagram illustrating a state in which the XML document data is divided in a page tag unit according to the first exemplary embodiment of the present invention.

FIGS. 11A to 10C illustrate encoding table examples corresponding to the respective XML divided document data (Part 1 to Part 3) according to the first exemplary embodiment of the present invention.

FIG. 12 is a flowchart for describing a creating method example of the encoding table according to a second exemplary embodiment of the present invention.

FIGS. 13A to 13E illustrate encoding table examples corresponding to the XML document data according to the second exemplary embodiment of the present invention.

DESCRIPTION OF THE EMBODIMENTS

Various embodiments of the present invention will now be described in detail in accordance with the accompanying drawings.

First Exemplary Embodiment

Hereinafter, a description will be provided of a first exemplary embodiment of the present invention.

Figure 1:
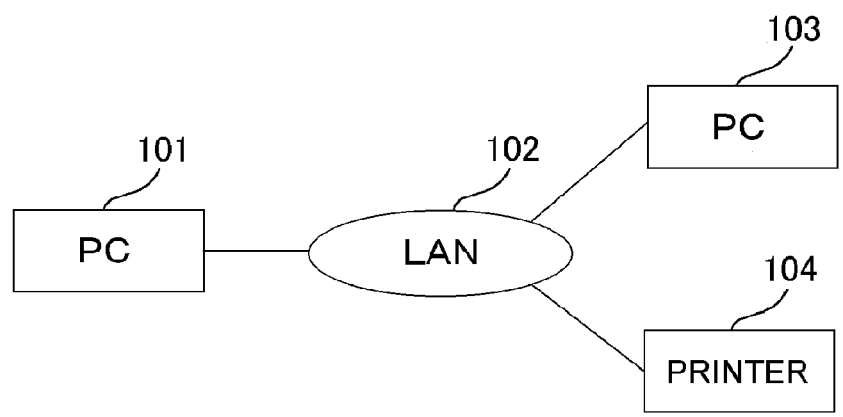
FIG. 1 illustrates an outline configuration of an example document data processing system according to a first exemplary embodiment of the present invention.

FIG. 1 illustrates an outline configuration example of a document data processing system. In FIG. 1, a document data processing system includes personal computers (PCs) 101 and 103, a LAN (Local Area Network) 102, and a printer 104.

The PC 101 is adapted to encode XML document data which is document data described in XML that is an example of a structured description language and send the encoded XML document data to another apparatus. The PC 101 is mutually connected to the PC 103 and the printer 104 via the LAN 102. It is noted that in a description provided below, the encoded XML document data is referred to as encoded data if necessary.

The PC 103 is adapted to decode the encoded data sent from the PC 101 and perform a processing on the decoded data. The printer 104 is adapted to decode the encoded data sent from the PC 101 and perform a print processing based on the decoded data. The printer 104 is such a inexpensive printer that performs a print processing on one page each, for example, and has an extremely small usable amount of memory as compared with the PC 103.

Figure 2:
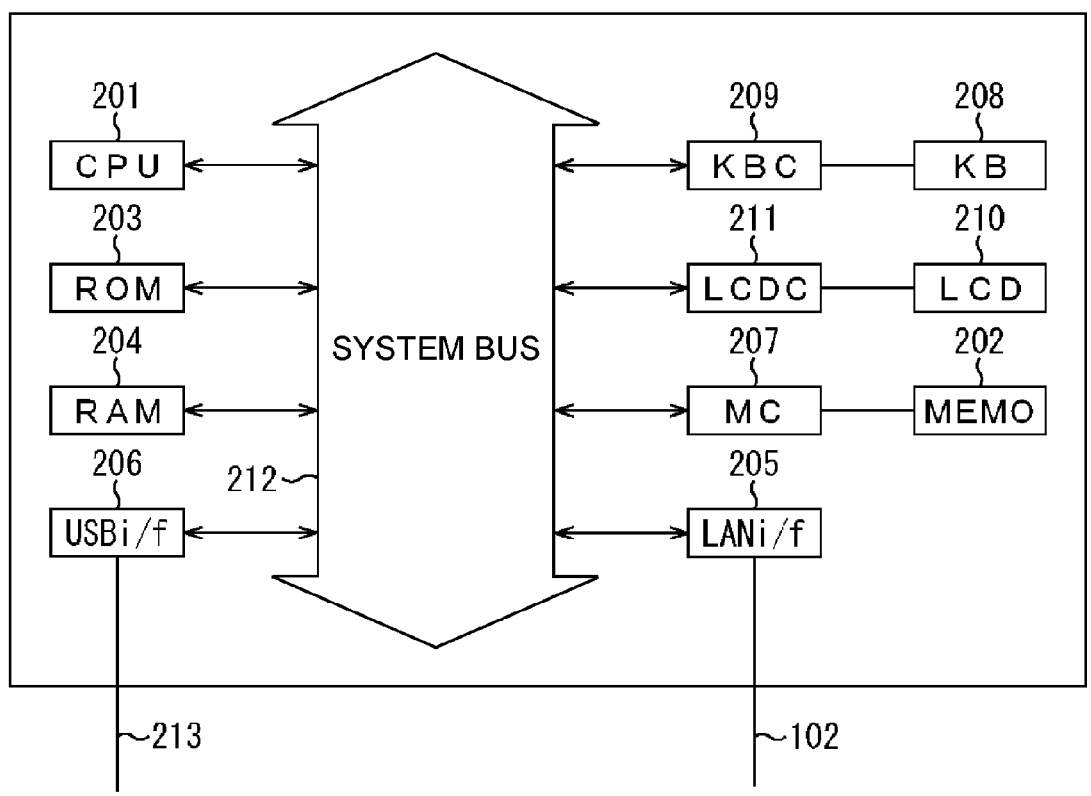
FIG. 2 is a block diagram illustrating an example configuration of PCs according to the first exemplary embodiment of the present invention.

FIG. 2 is a block diagram illustrating a configuration example of the PCs 101 and 103. In FIG. 2, a CPU (Central Processing Unit) 201 is adapted to control information processing in the PCs 101 and 103.

The CPU 201 expands a program stored in a ROM (Read Only Memory) 203 or a MEMO 202 on a RAM (Random Access Memory) 204 to execute the program. As a result, the CPU 201 controls the respective component units connected to a system bus 212 in an overall manner. In other words, while the CPU 201 reads out the processing program following a predetermined processing sequence from the ROM 203 or the MEMO 202 to execute the processing program, thus performing a control for realizing the operations in the PCs 101 and 103. It is noted that an access between the MEMO 202 and the CPU 201 is executed by an MC 207.

The MEMO 202 is a storage medium such as a hard disk drive which is installed to the PCs 101 and 103 fixed in position. In addition, as a recording medium detachably attached to the PCs 101 and 103, for example, the MEMO 202 has such a structure that an optical disk such as a flexible disk (FD) or a compact disk (CD), a magnetic card, an optical card, an IC card, and a memory card can be mounted to the MEMO 202.

The ROM 203 is adapted to store a program and a parameter which are not changed. The RAM 204 is adapted to store a program and data temporarily. A LAN i/f 205 is an interface for a connection to a network circuit such as the LAN 102. A USB i/f 206 is an interface for a connection to a USB (Universal Serial Bus) 213.

The LAN 102 and the USB 213 are used, for example, for sending the encoded data to the external apparatus such as the PC 103 or the printer 104.

A KB 208 is a key board functioning as a user interface. A KBC 209 is adapted to control an instruction input from the KB 208 or a pointing device not illustrated in the drawing, for example. An LCD 210 is a liquid crystal display functioning as a display unit. An LCDC 211 is adapted to control a display of the LCD 210.

It is noted that the CPU 201, the ROM 203, the RAM 204, the LAN i/f 205, the USB i/f 206, the MC 207, the KBC 209, and the LCDC 211 are mutually connected via the system bus 212.

Figure 3:
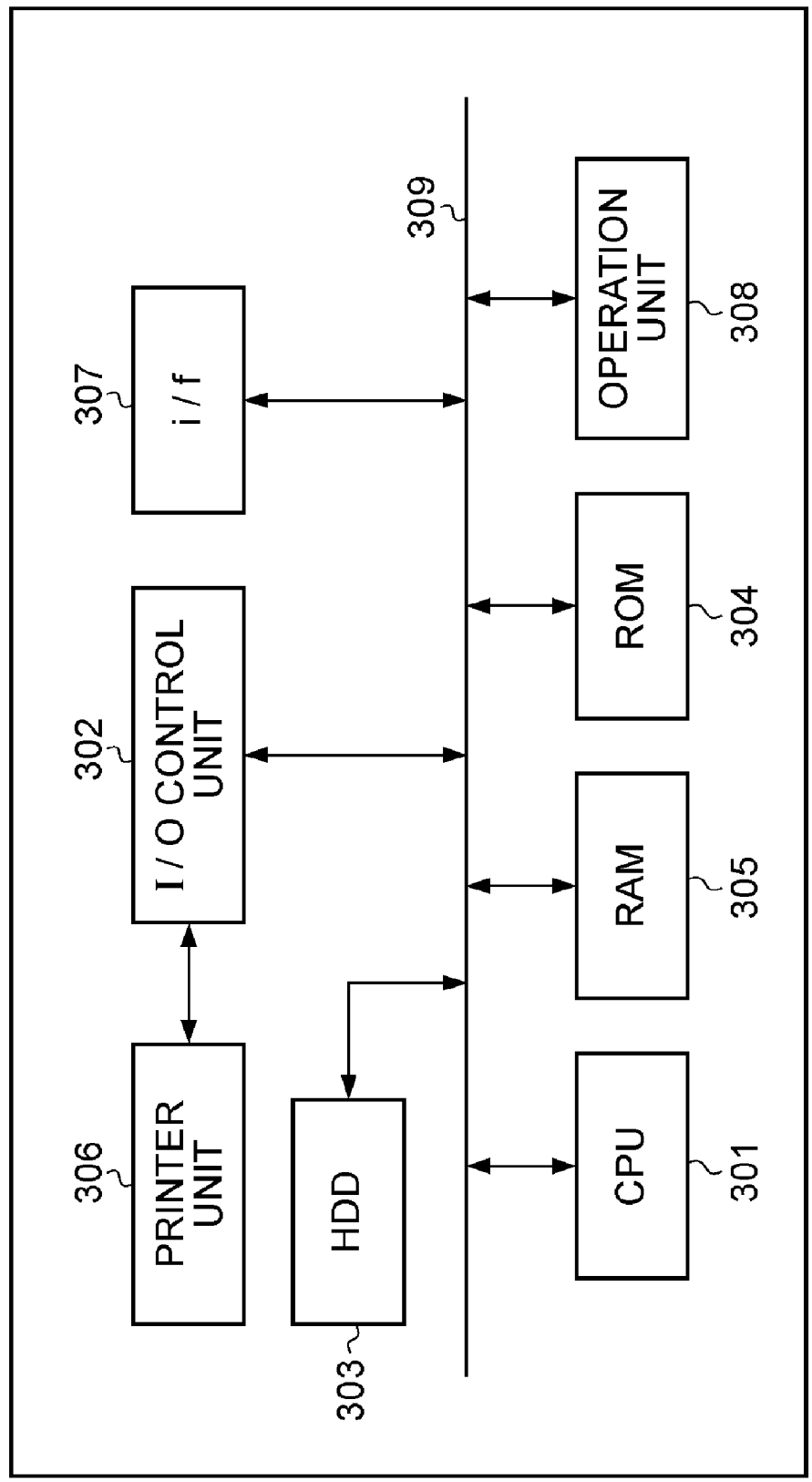
FIG. 3 is a block diagram illustrating an example configuration of a printer according to the first exemplary embodiment of the present invention.

FIG. 3 is a block diagram illustrating a configuration example of the printer 104. A CPU 301 reads a program stored in a HDD (Hard Disk Drive) 303 or a ROM 304. Then, the CPU 301 expands the read program on a RAM 305 for executing the program, thus performing a processing such as a decoding of the encoded data sent from the PC 101. Then, the CPU 301 controls an operation of a printer unit 306 via an I/O control unit 302.

The printer unit 306 is provided, for example, with a printer engine for executing a printing based on the data decoded by the CPU 301. The printer unit 306 is used for forming an image on a sheet of paper.

Also, the CPU 301 is connected to a network circuit such as the LAN 102 or the USB 213 via an i/f 307. As a result, the printer 104 can communicate with the external apparatuses such as the PCs 101 and 103. Furthermore, the CPU 301 is adapted to receive an operation of an operation unit 308 and perform a processing in accordance with a content of the received operation.

The operation unit 308 is provided with, for example, a user interface such as a button or a touch panel.

It is noted that the CPU 301, the I/O control unit 302, the HDD 303, the ROM 304, the RAM 305, the i/f 307, and the operation unit 308 are mutually connected via a system bus 309.

Next, a description will be provided of a processing example in the PC 101 (the CPU 201) for encoding the XML document data. It is noted that a processing of the PC 101 which will be described below is realized, for example, by executing the program stored in the ROM 203 or the MEMO 202. According to the present embodiment, a plurality of encoding tables are created in accordance with a division unit of the XML document data. Herein, a case in which the XML document data illustrated in FIG. 5 is divided in a page tag unit for the encoding will be described by way of an example.

In XML a part of document data 500 illustrated in FIG. 5, which is surrounded by a page tag, is information used only for a processing on one page. In a case where a processing is performed on the XML document data 500 illustrated in FIG. 5, for example, the printer 104 reads information of one page tag to perform the print processing for the one page. Then, the printer 104 discards the read information of the page tag, and thereafter performs the print processing for another page.

Figure 4:
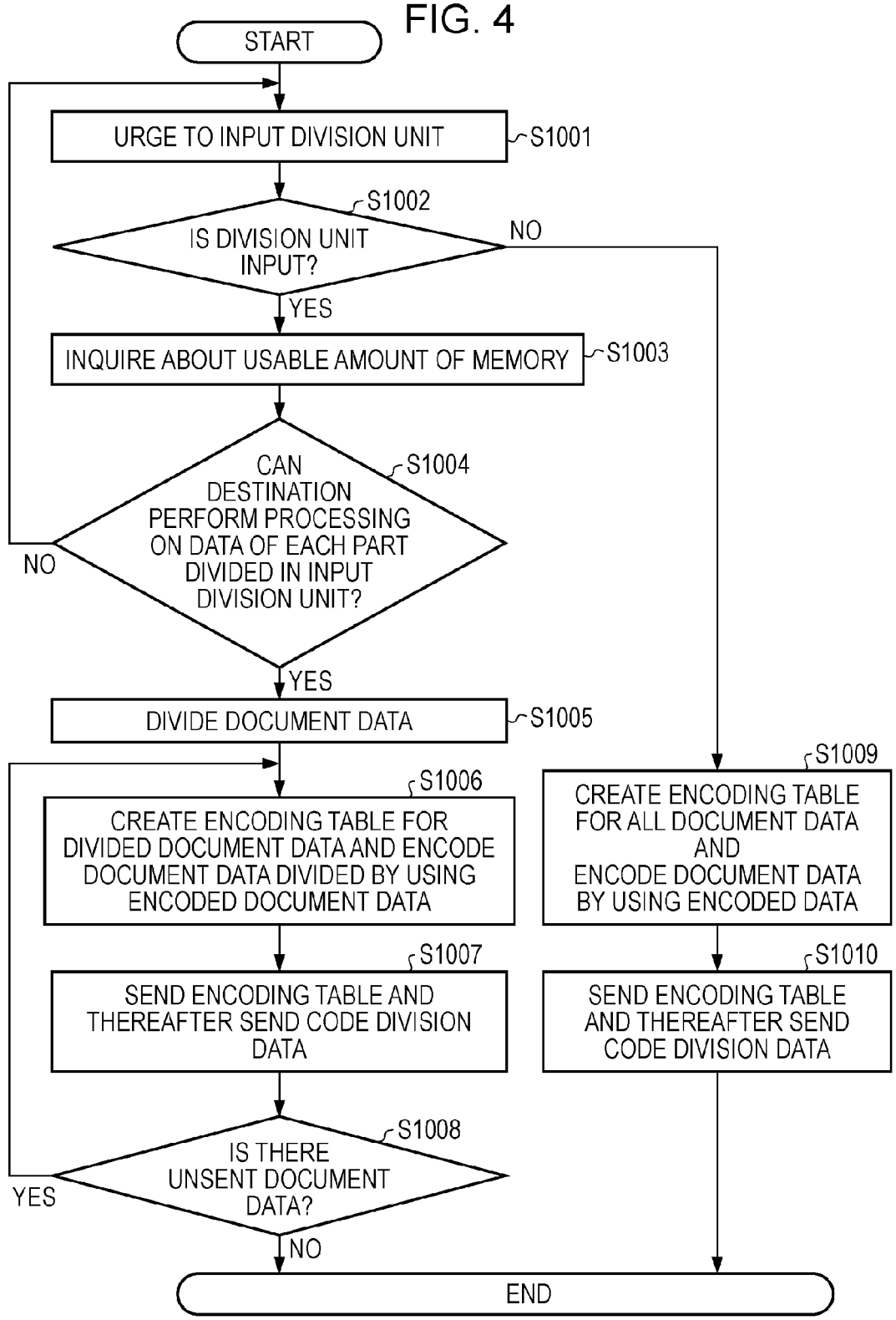
FIG. 4 is a flowchart for describing an example processing in the PC for encoding XML document data according to the first exemplary embodiment of the present invention.

FIG. 4 is a flowchart for describing an example processing in the PC for encoding XML document data according to the first exemplary embodiment of the present invention.

In Step S1001 of FIG. 4, the CPU 201 urges a user to perform an input regarding a division unit of the XML document data 500. To be more specific, for example, the CPU 201 displays a GUI (Graphic User Interface) for the print setting of the XML document data 500 on the LCD 210. Based on the GUI for the print setting, the user operates the pointing device or the KB 208 to perform the print setting. According to the present embodiment, in this print setting, when such a setting is made that the XML document data is sent to the PC 103, in the GUI for the print setting, the input regarding the division unit of the XML document data 500 may not be received. This is because the usable amount of memory in the PC 103 is a sufficient amount with which the XML document data 500 can be processed at once.

On the other hand, when such a setting is made that the XML document data 500 is sent to the printer 104, in the GUI for the print setting, the input regarding the division unit of the XML document data may be received. This is because the usable amount of memory in the printer 104 is a not sufficient amount with which the XML document data 500 cannot be processed at once.

After the print setting by using the above-described GUI for the print setting has been completed, when a print execution button displayed on the GUI for the print setting is pressed by, the processing advances to Step S1002.

When the processing advances to Step S1002, the CPU 201 determines whether the division unit of the XML document data 500 is input. As a result of this determination, in a case where the division unit of the XML document data 500 is input, the processing advances to Step S1003. On the other hand, in a case where the division unit of the XML document data 500 is not input, the processing advances to Step S1009.

As described above, according to the present embodiment, in a case where the destination of the XML document data 500 is the PC 103, the division unit of the XML document data 500 is not input. On the other hand, in a case where the destination of the XML document data 500 is the printer 104, for example, the page tag is input as the division unit of the XML document data 500.

As a result of the determination in Step S1002, when the division unit of the XML document data 500 is not input and the processing advances to Step S1009, the CPU 201 decides that the entire XML document data 500 is set as one division unit. Then, the CPU 201 creates an encoding table corresponding to the XML document data 500.

FIG. 6 illustrates an encoding table 600 example corresponding to the entire XML document data 500 illustrated in FIG. 5.

In FIG. 6, "Namespace name entry" indicates a namespace name. "Local name entry" indicates a local name. "attribute value entry" indicates an attribute value. "characters entry" indicates an element. A code in allocated to each item. "Element name entry" and "Attribute name entry" indicate an element name and an attribute name. A combination of code of "prefix", the namespace name, and the local name is "entry". Herein, "prefix" is not present, a part of a code of "prefix" is "_".

It is noted that an encoding table 600 illustrated in FIG. 6 is a table representing a corresponding relation between a vocabulary of a structure unit in the XML document data and a code represented by simplifying the vocabulary. Also, the encoding table 600 illustrated in FIG. 6 may be previously created by utilizing an XML schema or created dynamically. Alternatively, an encoding table used in the past may be reused.

After the encoding table 600 has been created in the above-described manner, the CPU 201 encodes the XML document data 500. Herein, the encoding may be preferably performed in the structure unit in the XML document data 500. Also, when the XML document data 500 is encoded, other than the encoding table 600 illustrated in FIG. 6, a code 700 illustrated in FIG. 7 which represents the structure of the XML document data. The code 700 representing the structure of the XML document data is previously determined based on the specification of the XML. FIG. 7 illustrates a code corresponding to a start tag, a code corresponding to characters, a code corresponding to an attribute, a code corresponding to an end tag, and the like. For example, a bit in the code corresponding to the start tag is set to 1 depending on the attribute, the present or absence of a namespace declaration, "prefix", and the present or absence of a namespace name. A bit in the code corresponding to the attribute is set to 1 depending on "prefix" and the present or absence of the namespace name.

FIG. 8 illustrates a result example after encoding a part of the XML document data 500 illustrated in FIG. 5 by using the encoding table 600 illustrated in FIG. 6 and the code 700 illustrated in FIG. 7.

After the XML document data 500 has been encoded in the above-described manner, the processing advances to Step S1010. When the processing advances to Step S1010, the CPU 201 sends the encoding table 600 created in Step S1009 via the LAN i/f 205 and the LAN 102 to the destination input in Step S1001. Then, the CPU 201 sends the XML document data encoded in Step S1009 (encoded data) via the LAN i/f 205 and the LAN 102 to the destination input in Step S1001.

As described above, the destination in a case where the XML document data 500 is not divided is the PC 103, and therefore the destination of the encoding table 600 created in Step S1009 and the encoded data is the PC 103.

When the PC 103 receives the encoding table 600 and the encoded data, the PC 103 decodes the encoded data by using the encoding table 600. The PC 103 can decode the encoded data at once as the usable amount of memory (resource) is sufficient.

As a result of the above-described determination in Step S1002, the division unit of the XML document data is input, and when the processing advances to Step S1003, the CPU 201 inquires the printer 104 that is the destination about the usable amount of memory via the LAN i/f 205. The CPU 301 of the printer 104 receiving this inquiry detects a usable capacity in the RAM 305. Then, based on the detected result, The CPU 301 of the printer 104 replies the usable amount of memory to the PC 101. As a result, the CPU 201 obtains the usable amount of memory in the printer 104.

Now referring back to FIG. 4, in Step S1004, the CPU 201 determines whether, the printer 104 can process data of each part of the XML document data divided in the division unit input in Step S1002 based on the usable amount of memory in the printer 104.

To be more specific, in the case of the XML document data divided in the division unit input in Step S1002, an additional value of a data amount of the XML document data encoded in a manner described below and a data amount of the encoding table corresponding to the XML document data is calculated. Then, it is determined whether the calculated data amount is equal to or smaller than the usable amount of memory in the printer 104 for each of divided XML document data.

In a case where the calculated data amount is equal to or smaller than the usable amount of memory in the printer 104, it is determined that the data of each part of the XML document data divided in the division unit input in Step S1002 can be processed by the printer 104. On the other hand, when the calculated data amount is larger than the usable amount of memory in the printer 104, it is determined that the data of each part of the XML document data divided in the division unit input in Step S1002 cannot be processed by the printer 104.

As a result of the above-described determination, in a case where the data of each part of the XML document data divided in the division unit input in Step S1002 cannot be processed by the printer 104, the processing returns to Step S1001. Then, the CPU 201 urges the user to input the division unit of the XML document data again.

On the other hand, in a case where the data of each part of the XML document data divided in the division unit input in Step S1002 can be processed by the printer 104, the processing advances to Step S1005. When the processing advances to Step S1005, the CPU 201 decides to divide the XML document data in the division unit which is determined to be input in Step S1002. To be more specific, for example, the CPU 201 specifies the division unit of the XML document by using a setting file or an API (Application Program Interface). As described above according to the present embodiment the obtaining unit is realized in the processing in Step S1005, for example.

Then, the CPU 201 divides the XML document data in the decided division unit. Herein, a case in which the page tag is the division unit is described, for example, the XML document data 500 illustrated in FIG. 5 is divided before the page tag as illustrated in FIG. 9. It is noted that in a description provided below, the respective parts 901 to 903 of the XML document data divided in this way are referred to as XML divided document data 901 to 903 when necessary. As described above, according to the present embodiment the dividing unit is realized in the processing in Step S1005, for example.

Next, in Step S1006, the CPU 201 creates an encoding table in accordance with the division unit decided in Step S1005. In other words, a plurality of encoding tables corresponding to the respective XML divided document data 901 to 903 are created.

FIGS. 10A to 10C illustrate encoding table examples corresponding to the respective XML divided document data 901 to 903 (Part 1 to Part 3) illustrated in FIG. 9. As illustrated in FIGS. 10A to 10C, the vocabulary included the respective XML divided document data 901 to 903 is included in the respective encoding tables 1001 to 1003. Herein, a locale name "page" is used for both the XML divided document data 902 of Part 2 and the XML divided document data 903 of Part 3 illustrated in FIG. 9. Therefore, the locale name "page" exists in both an encoding table 1002 of Part 2 and an encoding table 1003 of Part 3 illustrated in FIGS. 10B and 10C. It is noted that the encoding tables 1001 to 1003 illustrated in FIGS. 10A to 10C are tables each representing a corresponding relation between a vocabulary of a structure unit in the XML divided document data and a code.

In addition, when the encoding tables 1001 to 1003 illustrated in FIGS. 10A to 10C are created, if a namespace declaration exists in the XML divided document data, the CPU 201 additionally stores the namespace declaration. After that, for encoding the XML divided document data 901 to 903, in a case where the stored namespace declaration relates to the element name or the attribute name, the CPU 201 adds the corresponding namespace name in the entries of the encoding tables 1001 to 1003. In FIGS. 10A to 10C, a namespace name "http://www.w3.org/2000/svg" relates to all the element names and attribute names, and thus the corresponding namespace name in all the encoding tables 1001 to 1003 of Part 1 to Part 3. By describing the encoding tables 1001 to 1003 in the above-described way, the encoded XML divided document data 901 to 903 can be sequentially decoded on the reception side.

Then, the CPU 201 uses the encoding tables 1001 to 1003 created in the above-described manner and the code 700 representing the structure of the XML document data to encode the XML divided document data 901 to 903. Herein, the encoding is preferably performed in the structure unit in the XML divided document data 901 to 903. It is noted that according to the present embodiment, the processing in Step S1006 is performed in the stated order of the encoded XML divided document data 901 of Part 1, the encoded XML divided document data 902 of Part 2, and the encoded XML divided document data 903 of Part 3. Also, in a description provided below, the pieces of the encoded XML divided document data 901 to 903 are referred to as code division data.

Now referring back to FIG. 4, and as described above according to the present embodiment, the creating unit and the encoding unit are realize by the processing in Step S1006, for example.

Next, in Step S1007, the encoding tables 1001 to 1003 created in Step S1006 and the XML divided document data encoded in Step S1006 (code division data) are sent to the destination input in Step S1001. According to the present embodiment, by inserting the encoding tables 1001 to 1003 at the heading of the corresponding code division data (before the corresponding code division data), the encoding tables 1001 to 1003 are sent prior to the corresponding code division data.

As described above, the destination in the case of dividing the XML document data is the printer 104, and thus the destination of the encoding tables 1001 to 1003 created in Step S1009 and the code division data is the printer 104.

It is noted that according to the present embodiment, the processing in Step S1007 is performed in the stated order of the XML divided document data 901 of Part 1, the XML divided document data 902 of Part 2, and the XML divided document data 903 of Part 3. As described above according to the present embodiment, the sending unit and the sending step are realized by the processing in Step S1007, for example.

Next, in Step S1008, the CPU 201 determines whether the unsent pieces of the XML divided document data 901 to 903 exist. As a result of this determination, when the unsent pieces of the XML divided document data 901 to 903 exist, the processing returns to Step S1006. As described above, according to the present embodiment, first, the processing in Steps S1006 and S1007 is performed on the XML divided document data 901 of Part 1. Next, the processing in Steps S1006 and S1007 is performed on the XML divided document data 902 of Part 2. Then, the processing in Steps S1006 and S1007 is performed on the XML divided document data 903 of Part 3.

Figure 11:
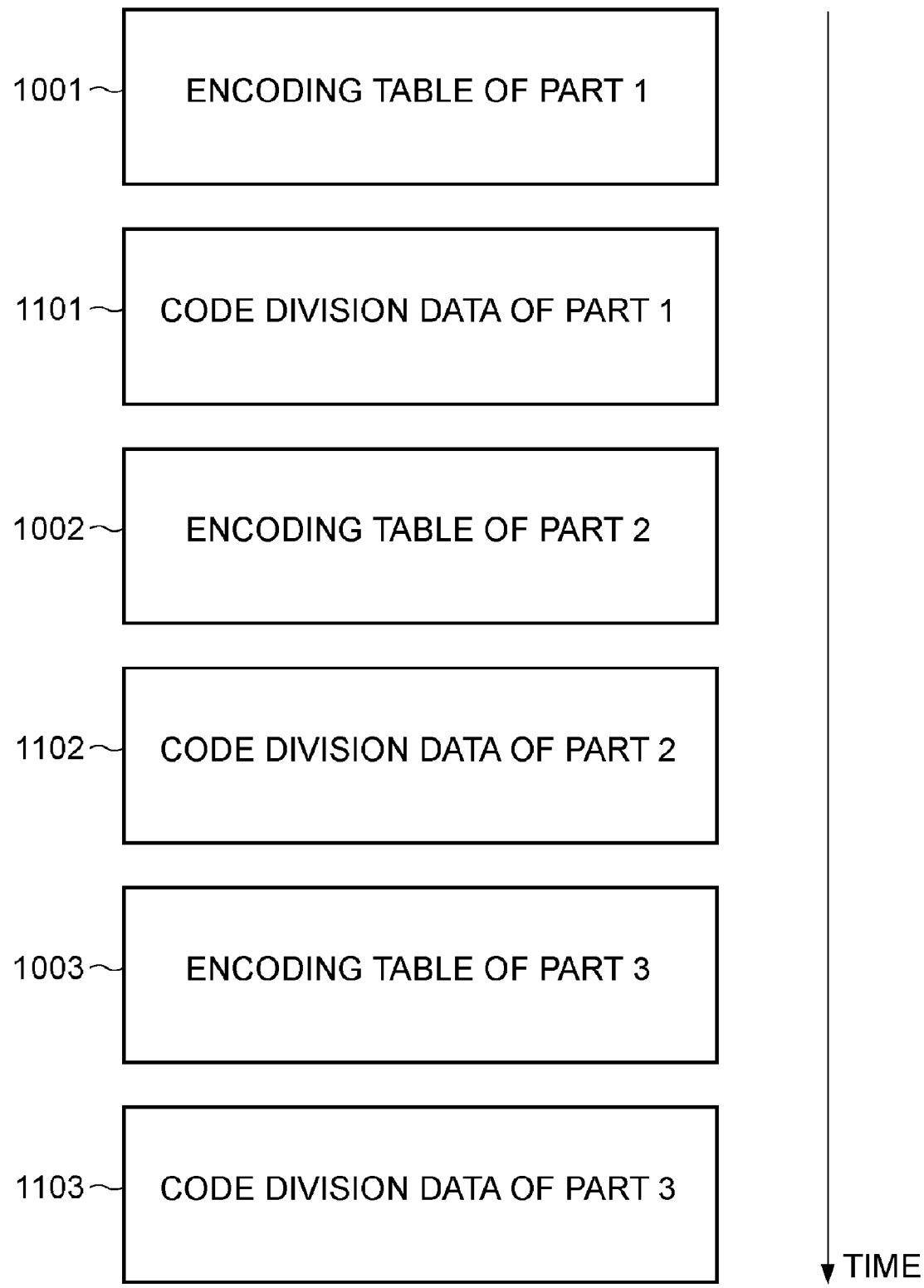
FIG. 11 illustrates a sending order example of the encoding tables and the code division data according to the first exemplary embodiment of the present invention.

As the processing is performed in the above-described manner, as illustrated in FIG. 11, the encoding tables 1001 to 1003 and code division data 1101 to 1103 are sequentially sent from the PC 101 to the printer 104. As described above, according to the present embodiment, while the encoding tables 1001 to 1003 corresponding to the code division data 1101 to 1103 are inserted at the heading of the code division data 1101 to 1103, the code division data and the encoding table are sent as illustrated in FIG. 11.

The printer 104 receives the encoding tables 1001 to 1003 and the code division data 1101 to 1103 corresponding to the encoding tables at the i/f 307. The CPU 301 uses the received encoding tables 1001 to 1003 to decode the code division data 1101 to 1103. The printer 104 cannot decode the entire XML document data at once as the usable amount of memory (resource) is not sufficient. In view of the above, first, the CPU 301 of the printer 104 receives the encoding table 1001 of Part 1 and stores the encoding table 1001 in the RAM 305 or the like. Next, as the code division data 1101 of Part 1 arrives, the CPU 301 uses the stored encoding table 1001 of Part 1 to sequentially decode the code division data 1101 of Part 1.

When the decoding of the code division data 1101 of Part 1 is ended, the CPU 301 receives the encoding table 1002 of Part 2. At this time, the encoding table 1001 of Part 1 becomes unnecessary. In view of the above, the CPU 301 discards the encoding table 1001 of Part 1 and substitutes the encoding table 1001 by the encoding table 1002 of Part 2. After that, the processing is repeatedly performed until all the pieces of the code division data 1101 to 1103 are decoded.

It is noted that the processing performed by the CPU 301 in the above-described manner is realized by executing the program stored in the HDD 303 or the ROM 304.

As described above according to the present embodiment, the reception unit is realized by using, for example, the i/f 307. Also, the decoding unit and the storage unit are realized by using the CPU 301 of the printer 104.

Also, as described above, according to the present embodiment, the PC 101 divides the XML document data 500 in the page tag unit and creates the encoding tables 1001 to 1003 for the XML divided document data 901 to 903. Next, the PC 101 uses the created encoding tables 1001 to 1003 to encode the XML divided document data 901 to 903, thus creating the code division data 1101 to 1103. Next, the PC 101 sends the encoding tables 1001 to 1003 and the code division data 1101 to 1103 corresponding to the encoding tables to the printer 104. In this manner, the encoding tables with a low redundancy are created and the encoded XML document data and the encoding tables are segmented into small pieces to be sent to the printer 104. Thus, even an apparatus with a small usable storage area such as an inexpensive printer can decode the XML document data.

In addition, according to the present embodiment, the additional value of the data amount of the encoding tables 1001 to 1003 and the data amount of the code division data 1101 to 1103 corresponding to the encoding tables is set equal to or smaller than the usable amount of memory in the printer 104 and sent to the printer 104. Therefore, the printer 104 can decode the XML document data with certainty.

It is noted that according to the present embodiment, the case in which the division unit of the XML document data 500 is the page tag has been described as an example. However, as long as the division unit of the XML document data 500 is the structure unit of the XML document data, for example, the division unit may be a tag other than the page tag.

Furthermore, the division unit of the XML document data 500 may be the data size. In this case, an additional value of a data amount of the code division data obtained through division in the data size that is the division unit and a data amount of the encoding table corresponding to the code division data is calculated for each XML divided document data. Then, it is determined whether the calculated data amount is equal to or smaller than the usable amount of memory in the printer 104. As a result of this determination, when the calculated data amount is equal to or smaller than the usable amount of memory in the printer 104, in order that the calculated data amount is set equal to or smaller than the data size that is the division unit, the XML document data is divided in a unit of vocabulary for example.

Also, according to the present embodiment, the case in which the division unit of the XML document data 500 is obtained through the operation of the user has been described as an example. However, the configuration may not necessarily be the above-described one. For example, a division unit of the XML document is previously set by installing such information that the page tag is divided into software, and the set division unit of the XML document data 500 may be obtained by the CPU 201. Furthermore, the division unit of the XML document data 500 is previously set by using an xpath in the XML document, and the set division unit of the XML document may be obtained by the CPU 201.

Also, according to the present embodiment, the printer 104 is inquired about the usable amount of memory, and in a case where the found amount of memory is equal to or smaller than the additional value of the data amount of the code division data and the data amount of the encoding table corresponding to the code division data, the XML document data 500 is divided. However, the configuration may not necessarily be the above-described one. For example, in a case where the additional value of the data amount of the code division data and the data amount of the encoding table corresponding to the code division data is equal to or smaller than the previously set data amount, the XML document data may be divided. Also, based only on the data amount of the encoding table, it may be determined whether each part of the data in the divided XML document data can be processed by the printer 104.

Also, according to the present embodiment, the case in which the structured description language is the XML has been described as an example. However, the operation according to the present embodiment can be applied to document data described in any language as long as the language is the structured description language. For example, SGML (Standard Generalized Mark-up Language) or other mark-up languages can be used. Furthermore, as described above, in a case where the data size or the like is set as the division unit, the document data may not necessarily be described in the structured description language.

Also, according to the present embodiment, the case in which the PC 101 is used as the apparatus (document data creating apparatus) for dividing the document data to perform the encoding and also creating the encoding table has been described as an example. Furthermore, the case in which the printer 104 is used as the apparatus (document data processing apparatus) for decoding the encoded document data by using the encoding table has been described as an example. However, the document data creating apparatus and the document data processing apparatus are not limited to the above-described apparatuses. For example a digital multifunction apparatus may be used instead of the printer as the document data processing apparatus.

Also, according to the present embodiment, the case in which the XML document data is divided in the page tag unit that is an example of the structure unit of the XML document data to perform the encoding has been described as an example. However, the configuration may not necessarily be the above-described one. For example, the CPU 201 may obtain information related to an influential scope of a namespace included in the XML document data based on, for example, the input operation by the user and divide HML document data by using the obtained influential scope of the namespace as the division unit for the encoding. It is noted that the information related to the influential scope of the namespace refers to, for example, information indicating the beginning and the end of the namespace.

Second Exemplary Embodiment

Next, a description will be provided of a second exemplary embodiment of the present invention. According to the above-described first exemplary embodiment, as illustrated in FIGS. 10A to 10C, even in a case of a vocabulary existing in plural pieces of the XML divided document data, a code corresponding to the vocabulary is registered in each of the encoding tables 1001 to 1003. In other words, the encoding table and the code division data have one to one correspondence.

In contrast, according to the present embodiment, an effective scope of an encoding table is set and an encoding tables corresponding to plural pieces of code division data are created, so that a vocabulary crossing plural pieces of XML divided document data can be registered in the encoding tables without redundancy.

In this manner, the present embodiment is different from the above-described first exemplary embodiment in that a part of the method of creating the encoding table from the XML divided document data. Therefore, for the present embodiment, a detailed description will be omitted for the similar parts to those of the above-described first exemplary embodiment while the same reference numerals as those allocated to the components in FIGS. 1 to 11 are used. It is noted that according to the present embodiment as well, a case where the document data described in the XML illustrated in FIG. 5 is divided in the page tag unit as illustrated in FIG. 9 for the encoding will be described by way of an example.

With reference to a flowchart of FIG. 12, a description will be provided of a creating method example of the encoding table according to the present embodiment. It is noted that the processing of the flowchart in FIG. 12 is performed in the stated order of the XML divided document data 901 of Part 1, the XML divided document data 902 of Part 2, and the XML divided document data 903 of Part 3 as illustrated in FIG. 9.

First, in Step S1301, the CPU 201 of the PC 101 determines whether the encoding tables for all the XML document data 500 are already created. As a result of this determination, in a case where the encoding tables for all the XML document data 500 are already created, Steps S1302 to S1306 are skipped, and the processing advances to Step S1307 described later. On the other hand, in a case where the encoding tables for all the XML document data 500 are not created, as it is necessary to create the encoding tables, the processing advances to Step S1302.

When the processing advances to Step S1302, the CPU 201 determines whether a correspondence between a code that should be registered in an encoding table corresponding to the XML divided document data of a processing target part and a vocabulary is registered in the already created encoding table. As a result of this determination, in a case where the correspondence between the code that should be registered in the encoding table and the vocabulary is not registered in the already created encoding table, the processing advances to Step S1303.

When the processing advances to Step S1303, the CPU 201 registers the correspondence between the code and the vocabulary which is not registered in the already created encoding table to create the encoding table. This effective scope of the encoding table created in Step S1303 becomes the current processing target part. Then, the processing advances to Step S1306 described later.

In Step S1302, in a case where the correspondence between the code that should be registered in the encoding table and the vocabulary is registered in the already created encoding table, the processing advances to Step S1304. When the processing advances to Step S1304, the CPU 201 determines whether the current processing target part is included in the effective scope of the already created encoding table. As a result of this determination, in a case where the current processing target part is included in the effective scope of the already created encoding table, the processing advances to Step S1306 described later.

On the other hand, in a case where the current processing target part is not included in the effective scope of the already created encoding table, the processing advances to Step S1305. When the processing advances to Step S1305, the CPU 201 deletes the correspondence between the code and the vocabulary which is determined in Step S1302 to be registered in the already created encoding table from the encoding table. Then, the CPU 201 creates a new encoding table in which the deleted correspondence between the code and the vocabulary is registered. The effective scope of the encoding table created in Step S1305 is composed of the part included in the effective scope of the already created encoding table and the current processing target part. Then, the processing advances to Step S1306.

When the processing advances to Step S1306, the CPU 201 determines whether the encoding tables for all the XML document data 500 are created. As a result of this determination, in a case where the encoding tables for all the XML document data are not created, the processing returns to Step S1302, and while the next part is set as the processing target, the processing in Steps S1302 to S1305 is performed again. In other words, after processing on the XML divided document data 901 of Part 1, the processing is performed on the XML divided document data 902 of Part 2. After that, when the processing on the XML divided document data 903 of Part 3 is ended, the processing advances to Step S1307.

When the processing advances to Step S1307, the encoding table and the code representing the structure of the XML document data are used to encode the XML divided document data.

Next, in Step S1308, the CPU 201 inserts the encoding table at the heading of the code division data so that the encoding table and the code division data are sent to the printer 104 in the stated order. Herein, the encoding table is inserted at the heading of (before) the code division data for the first part in the effective scope. For example, if the effective scope of the encoding table is Part 1 and Part 2, the encoding table is inserted at the heading of the code division data for Part 1. It is noted that according to the present embodiment, similarly to the first exemplary embodiment, the processing in Steps S1307 and S1308 are performed in the stated order of Part 1, Part 2, and Part 3.

Figure 14:
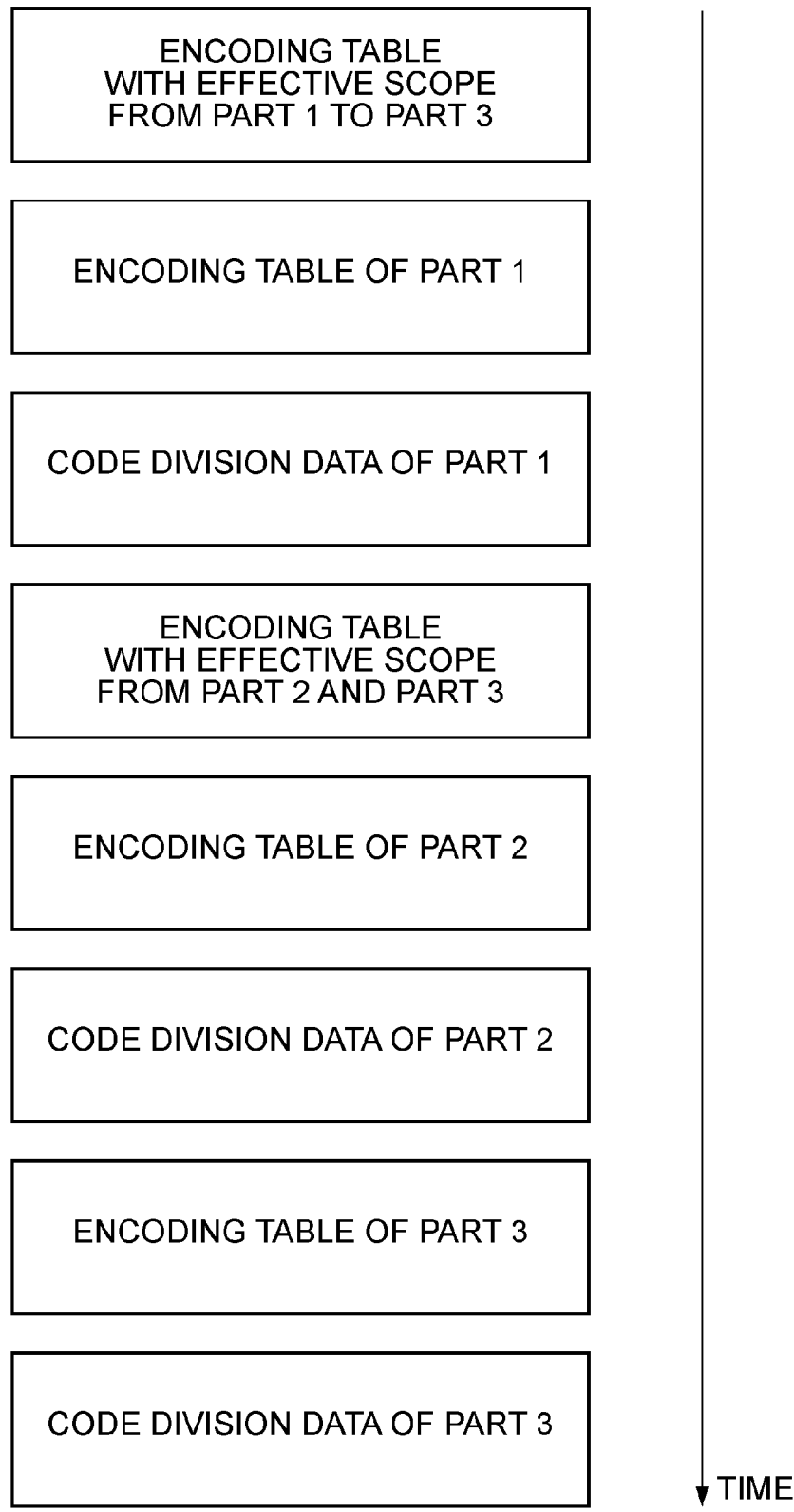
FIG. 14 illustrates a sending order example of the encoding tables and the code division data according to the second exemplary embodiment of the present invention.

Next, a specific example of a processing in a flowchart of FIG. 12 will be described with reference to FIGS. 13A to 13E and 14. FIGS. 13A to 13E illustrate encoding table examples for the XML document data illustrated in FIG. 9. FIG. 14 illustrates a sending order example of encoding tables and code division table.

First, an encoding table for the XML divided document data 901 of Part 1 is created. The CPU 201 checks whether a correspondence between a code that should be registered in the encoding table corresponding to the XML divided document data 901 of Part 1 and the vocabulary is registered in the already created encoding table (Step S1302). In this case, there is no already created encoding table, and thus the encoding table of Part 1 is created in which all the correspondences between codes that should be registered in the encoding table for the XML divided document data 901 of Part 1 and vocabularies are registered (Step S1303). The effective scope of an encoding table is composed only of Part 1.

Next, the encoding table for the XML divided document data 902 of Part 2 is created. The CPU 201 checks whether a correspondence between a code that should be registered in the encoding table corresponding to the XML divided document data 902 of Part 2 and the vocabulary is registered in the already created encoding table (Step S1302). "http://www.w3.org/2000/svg" which is a namespace name is necessary for the element name of Part 2 and the encoding of the attribute name, but is registered in the encoding table of Part 1 and common therein.

In view of the above, the CPU 201 checks whether Part 2 that is the current processing target is included in the effective scope of the encoding table of Part 1 (Step S1304). The effective scope of the encoding table of Part 1 is Part 1. Therefore, Part 2 that is the current processing target is not included in the effective scope of the encoding table of Part 1.

Then, in view of the above, the CPU 201 deletes the correspondence between "0x00" and "http://www.w3.org/2000/svg" which is registered in the encoding table of Part 1 from the encoding table of Part 1. Then, the CPU 201 creates an encoding table of Part 1 and Part 2 in which a corresponding relation between "0x00" and "http://www.w3.org/2000/svg" is registered. This effective scope of the encoding table of Part 1 and Part 2 is Part 1 which is the effective scope of the encoding table of Part 1 and Part 2 that is the current processing target.

The remaining vocabularies of Part 2 are not registered in the already created encoding table of Part 1. Therefore, the CPU 201 creates an encoding table of Part 2 in which all the correspondences between these vocabularies and codes are registered (Step S1303). The effective scope of this encoding table is only Part 2.

Finally, an encoding table corresponding to the XML divided document data 903 of Part 3 is created. The CPU 201 checks whether a correspondence between a code that should be registered in the encoding table corresponding to the XML divided document data 903 of Part 3 and the vocabulary is registered in the already created encoding table (Step S1302). "http://www.w3.org/2000/svg" which is a namespace name, "page" which is a local name, and "_00" which is an element name are necessary for the encoding of Part 3. However, these names are already registered in the encoding table of Part 1 and Part 2 and the encoding table of Part 2 and common therein.

In view of the above, the CPU 201 checks whether Part 3 that is the current processing target is included in the effective scope of the encoding table of Part 1 and Part 2 and the effective scope of the encoding table of Part 2 (Step S1304). The effective scope of the encoding table of Part 1 and Part 2 is only Part 1 and Part 2. Therefore, Part 3 that is the current processing target is not included in the effective scope of the encoding table of Part 1 and Part 2. Also, the effective scope of the encoding table of Part 2 is Part 2. Therefore, Part 3 that is the current processing target is not included in the effective scope of the encoding table of Part 2.

Then, in view of the above, the CPU 201 deletes the correspondence between "0x00" and "http://www.w3.org/2000/svg" which is registered in the encoding table of Part 1 and Part 2 from the encoding table of Part 1 and Part 2. In this case, there is no vocabulary registered in the encoding table of Part 1 and Part 2, and thus the encoding table of Part 1 and Part 2 itself is deleted. Then, the CPU 201 creates an encoding table of Part 1 to Part 3 in which the correspondence between "0x00" and "http://www.w3.org/2000/svg" is registered. This effective scope of the encoding table of Part 1 to Part 3 is Part 1 and Part 2 which are the effective scope of the encoding table of Part 1 and Part 2, and Part 3 that is the current processing target.

It is noted herein that the encoding table of Part 1 and Part 2 is deleted and the encoding table of Part 1 to Part 3 is created, but the configuration may not necessarily be the above-described one. For example, the effective scope of the encoding table of Part 1 and Part 2 may be expanded to Part 1 to Part 3.

In addition, the correspondences between "0x00" and "page" and "_00" which are registered in the encoding table of Part 2 are deleted from the encoding table of Part 2. Then, the CPU 201 creates an encoding table of Part 2 and Part 3 in which the correspondences between "0x00" and "page" and "_00" are registered. This effective scope of the encoding table of Part 2 and Part 3 is Part 2 that is the effective scope of the encoding table of Part 2 and Part 3 that is the current processing target.

The remaining vocabularies of Part 3 are not registered in the already created encoding table of Part 1, the encoding table of Part 2, and the encoding table of Part 1 and Part 2.

Therefore, the CPU 201 creates an encoding table of Part 3 in which all the correspondence between these vocabularies and codes are registered (Step S1303). The effective scope of this encoding table is only Part 3.

In FIGS. 13A to 13E, "scope=3" is described as the effective scope in the encoding table of Part 1 to Part 3, and "scope=2" is described as the effective scope in the encoding table of Part 2 and Part 3.

As described above according to the present embodiment, for example, the setting unit and the creating unit are realized by the processing in Steps S1303 and S1305.

The CPU 201 inserts, as illustrated in FIG. 14, the encoding table at the heading of (before) the code division data, so that the encoding table and the code division data are sent in the stated order to the printer 104. Herein, the encoding table is inserted at the heading of the code division data corresponding to the first part in the effective scope. As illustrated in FIG. 14, in a case where a plurality of encoding tables are inserted at the heading of the code division data, an encoding table with a wide effective scope is inserted at the heading.

As described above, according to the present embodiment, the effective scope is set in the encoding table and the vocabulary crossing the plural parts is put into the single encoding table. Therefore, in addition to the effects described in the first exemplary embodiment, it is possible to attain an effect that an encoding table with even smaller redundancy can be created.

It is noted that according to the present embodiment, all the encoding tables are created and thereafter the data is sent, but the configuration may not necessarily be the above-described one. In other words, the data may be sent while the encoding is performed. At this time, a vocabulary appears while crossing the sending unit, the effective scope is once interrupted in the sending unit and then the encoding table is created. For example, in a case where Part 1 and Part 2 are set as the sending unit, the encoding table of Part 1 to Part 3 are not created from the encoding table of Part 1 and Part 2, and also the encoding table of Part 2 and Part 3 is not created from the encoding table of Part 2. With this configuration, even when the data is sent while the encoding is performed, it is possible to prevent with certainty such a situation that the encoding table is absent in the destination.

In addition, according to the present embodiment, the case in which the effective scope is continuous in the parts like the encoding table of Part 1 to Part 3 and the encoding table of Part 2 and Part 3 has been described as the example, but the configuration may not necessarily be the above-described one. In other words, an encoding table whose effective scope is not continuous (for example, an encoding table whose effective scope is Part 1 and Part 3 may be created.

Furthermore, according to the present embodiment as well, various modifications described in the first exemplary embodiment may be adopted.

Other Exemplary Embodiments

In order that various devices are operated to realize the functions of the above-described embodiments, a software program code for realizing the functions of the above-described embodiments may be supplied to an apparatus or a computer in a system which is connected to the various devices. The scope of the present invention includes a case embodied by operating the above-described various devices in accordance with a program stored in a computer (or a CPU or an MPU) of the system or the apparatus.

Also, in this case, the program code itself of the software realizes the functions of the above-described embodiments. Also, the program code itself and a unit configured to supply the program code to the computer, for example, a storage medium on which the program code is stored constitute the present invention. For the storage medium on which the program code is stored, for example, a flexible disk, a hard disk drive, an optical disk, an opto-magnetic disk, a CD-ROM, a CD-R, a magnetic tape, a non-volatile memory card, a ROM, a DVD, or the like may be used.

In addition, the functions of the above-described embodiments are realized not only by executing the program code supplied to the computer. The program code is also included in the embodiment of the present invention even in a case where the program code is operated in association with an operating system running in the computer, another application software, or the like to realize the functions of the above-described embodiments.

Furthermore, the supplied program code is stored on a memory provided to a function expansion board of the computer, and thereafter a CPU provided to the function expansion board executes all or a part of an actual processing in accordance with an instruction of the program code. The present invention of course also includes a case where the functions of the above-described embodiments are realized by the processing.

Moreover, the supplied program code is stored on a memory provided to a function expansion unit, and thereafter a CPU or the like provided to the function expansion unit executes all or a part of an actual processing in accordance with an instruction of the program code. The present invention of course also includes a case where the functions of the above-described embodiments are realized by the processing.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

This application claims the benefit of Japanese Application No. 2006-326139 filed Dec. 1, 2006, which is hereby incorporated by reference herein in its entirety.

What is claimed is:

1. A document data processing method, comprising:
   dividing document data into plural divided document data, the plural divided document data comprising at least first divided document data and second divided document data;
   creating a first encoding table representing a first corresponding relation between a first description of the first divided document data and a first code, and a second encoding table representing a second corresponding relation between a second description of the second divided document data and a second code;
   encoding the first divided document data into first encoded document data by replacing the first description with the first code based on the first encoding table, and the second divided document data into second encoded document data by replacing the second description with the second code based on the second encoding table;
   sending, to an external apparatus, the first encoded document data with the first encoding table;
   sending, to the external apparatus, the second encoded document data with the second encoding table after the first encoded document data with the first encoding table is sent,
   wherein the external apparatus decodes the first encoded document data according to the first encoding table stored in a memory of the external apparatus, and thereafter, the external apparatus decodes the second encoded document data according to the second encoding table which has replaced the first encoding table in the memory;

obtaining a division unit of the document data, wherein dividing includes dividing the document data into the plural divided document data according to the obtained division unit, wherein the document data is data described in a structured description language, and obtaining includes obtaining a structure unit in the document data as the division unit of the document data;

detecting, when the first encoding table is received by the external apparatus, an effective scope of the received first encoding table; and discarding the received first encoding table after the first divided document data belonging to the effective scope of the received first encoding table is decoded.

2. The document data processing method according to claim 1, wherein the structure unit is a page unit.

3. The document data processing method according to claim 1, wherein obtaining includes obtaining a data size as the division unit of the document data, and dividing includes dividing the document data into the plural divided document data so that an additional value of a data amount of the encoded document data and a data amount of the encoding table corresponding to the document data is equal to or smaller than the obtained data size.

4. The document data processing method according to claim 1, wherein obtaining includes obtaining an influential scope of a namespace as the division unit of the document data, and the dividing includes dividing the document data into the plural divided document data based on the influential scope of the namespace.

5. The document data processing method according to claim 1, further comprising: setting an effective scope of the first encoding table,
wherein creating includes creating, in a case where a common description is present in the first divided document data and the second divided document data, the first encoding table further representing a corresponding relation between the common description and the first code, and
wherein setting includes setting the plural divided document data having the common description as an effective scope of the first encoding table.

6. The document data processing method of claim 1, further comprising:
receiving, from an encoding apparatus, a first encoded document data with a first encoding table;
decoding the first encoded document data according to the first encoding table stored in a memory;
receiving, from the encoding apparatus, a second encoded document data with a second encoding table;
replacing the first encoding table in the memory with the received second encoding table; and
decoding the second encoded document data according to the second encoding table stored in the memory,
wherein the encoding apparatus divides document data into plural divided document data, the plural divided document data comprising first divided document data and second divided document data,
wherein the encoding apparatus generates the first encoded document data and the first encoding table based on the first divided document data, and the second encoded document data and the second encoding table based on the second divided document data,
wherein the encoding apparatus sends the first encoded document data with the first encoding table, and
wherein the encoding apparatus sends the second encoded document data with the second encoding table after the first encoded document data with the first encoding table is sent.

7. A document data creating system, comprising:
a first document data creating apparatus, comprising:
a central processing unit:
a dividing unit configured to divide document data into plural divided document data, the plural divided document data comprising at least first divided document data and second divided document data;
a creating unit configured to create a first encoding table representing a first corresponding relation between a description of the first document data divided by the dividing unit and a first code, and a second encoding table representing a second corresponding relation between a second description of the second divided document data and a second code;
an encoding unit configured to encode the first divided document data obtained by the dividing unit into first encoded document data by replacing the first description with the first code based on the first encoding table, and the second divided document data into second encoded document data by replacing the second description with the second code based on the second encoding table;
a first sending unit configured to send, to an external apparatus, the first encoded document data with the first encoding table;
a second sending unit configured to send, to the external apparatus, the second encoded document data with the second encoding table after the first encoded document data with the first encoding table is sent by the first sending unit,
wherein the external apparatus decodes the first encoded document data according to the first encoding table stored in a memory of the external apparatus, and thereafter, the external apparatus decodes the second encoded document data according to the second encoding table which has replaced the first encoding table in the memory;
an obtaining unit configured to obtain the division unit of the document data, wherein the dividing unit divides the document data into the plural divided document data according to the division unit obtained by the obtaining unit, wherein the document data is data described in a structured description language, and the obtaining unit obtains a structure unit in the document data as the division unit of the document data;
a detecting unit configured to detect, when the first encoding table is received by the external apparatus, an effective scope of the received first encoding table; and
a discarding unit configured to discard the received first encoding table after the first divided document data belonging to the effective scope of the received first encoding table is decoded.

8. The document data creating system according to claim 7, wherein the structure unit is a page unit.

9. The document data creating system according to claim 7, wherein the obtaining unit obtains a data size as the division unit of the document data, and the dividing unit divides the document data into the plural divided document data so that an additional amount of a data amount of the document data encoded by the encoding unit and a data amount of the encoding table corresponding to the document data is equal to or smaller than the data size obtained by the obtaining unit.

10. The document data creating system according to claim 7, wherein the obtaining unit obtains an influential scope of a namespace as the division unit of the document data, and the dividing unit divides the document data into the plural divided document data based on the influential scope of the namespace.

11. The document data creating system according to claim 7, further comprising: a setting unit configured to set an effective scope of the first encoding table, wherein the creating unit creates, in a case where a common description is present in the plural pieces of document data divided by the dividing unit, an encoding table representing a corresponding relation between the common description and a code representing the description, and
wherein the setting unit sets the plural pieces of document data having the common description as an effective scope of the encoding table representing the corresponding relation between the common description and the code representing the description.

12. The document data creating system of claim 7, further comprising:
a second document data creating apparatus, comprising:
a first receiving unit that receives, from an encoding apparatus, first encoded document data with a first encoding table,
a first decoding unit that decodes the first encoded document data according to the first encoding table stored in a memory,
a second receiving unit that receives, from the encoding apparatus, second encoded document data with a second encoding table,
a replacing unit that replaces the first encoding table in the memory with the received second encoding table, and
a second decoding unit that decodes the second encoded document data according to the second encoding table stored in the memory,
wherein the encoding apparatus divides document data into plural divided document data, the plural divided document data comprising first divided document data and second divided document data,
wherein the encoding apparatus generates the first encoded document data and the first encoding table based on the first divided document data, and the second encoded document data and the second encoding table based on the second divided document data,
wherein the encoding apparatus sends the first encoded document data with the first encoding table, and
wherein the encoding apparatus sends the second encoded document data with the second encoding table after the encoded document data with the first encoding table is sent.

13. A non-transitory computer readable medium containing computer-executable instructions for instructing a computer to execute a program for processing data, the computer readable medium comprising:
computer-executable instructions for dividing document data into plural divided document data, the plural divided document data comprising at least first divided document data and second divided document data;
computer-executable instructions for creating a first encoding table representing a first corresponding relation between a first description of the divided document data and a first code, and a second encoding table representing a second corresponding relation between a second description of the second divided document data and a second code;
computer-executable instructions for encoding the first divided document data into first encoded document data by replacing the first description with the first code based on the first encoding table, and the second divided document data into second encoded document data by replacing the second description with the second code based on the second encoding table;
computer-executable instructions for sending, to an external apparatus, the first encoded document data with the first encoding table; and
computer-executable instruction for sending, to the external apparatus, the second encoded document data with the second encoding table after the first encoded document data with the first encoding table is sent,
wherein the external apparatus decodes the first encoded document data according to the first encoding table stored in a memory of the external apparatus, and the external apparatus decodes the second encoded document data according to the second encoding table which has replaced the first encoding table in the memory;
computer-executable instruction for obtaining a division unit of the document data, wherein dividing includes dividing the document data into the plural divided document data according to the obtained division unit, wherein the document data is data described in a structured description language, and obtaining includes obtaining a structure unit in the document data as the division unit of the document data;
computer-executable instruction for detecting, when the first encoding table is received by the external apparatus, an effective scope of the received first encoding table; and
computer-executable instruction for discarding the received first encoding table after the first divided document data belonging to the effective scope of the received first encoding table is decoded.

* * * * *